(12) United States Patent
Darmann et al.

(10) Patent No.: US 7,193,825 B2
(45) Date of Patent: Mar. 20, 2007

(54) SUPERCONDUCTING FAULT CURRENT LIMITER

(75) Inventors: Francis Anthony Darmann, New South Wales (AU); Timothy Paul Beales, New South Wales (AU)

(73) Assignee: Metal Manufactures Limited, New South Wales (AU)

( * ) Notice: Subject to any disclaimer, the term of this patent is extended or adjusted under 35 U.S.C. 154(b) by 0 days.

(21) Appl. No.: 10/531,823

(22) PCT Filed: Oct. 21, 2003

(86) PCT No.: PCT/AU03/01395

§ 371 (c)(1),
(2), (4) Date: Apr. 18, 2005

(87) PCT Pub. No.: WO2004/038817

PCT Pub. Date: May 6, 2004

(65) Prior Publication Data

US 2006/0044105 A1  Mar. 2, 2006

(30) Foreign Application Priority Data

Oct. 22, 2002  (AU) .............................. 2002952197

(51) Int. Cl.
*H02H 9/00* (2006.01)
*H01F 36/00* (2006.01)
(52) U.S. Cl. .................... 361/19; 323/360; 505/850
(58) Field of Classification Search ................ 361/19; 323/362, 360; 505/850
See application file for complete search history.

(56) References Cited

U.S. PATENT DOCUMENTS 4,045,823 A  8/1977  Parton ........................ 361/19
4,117,524 A * 9/1978  Parton et al. ................. 361/19
4,336,561 A * 6/1982  Murphy ........................ 361/19

(Continued)

FOREIGN PATENT DOCUMENTS

| DE | 19851047 | 6/1999 |
| EP | 984462 | 3/2000 |
| GB | 2321137 | 7/1998 |

OTHER PUBLICATIONS

Elliott, Rod. "Transformers—The Basics Section 1." Beginner's Guide to Transformers Mar. 24, 2001 Apr. 2006 <http://sound.westhost.com/xfmr.htm>.*
Raju et al., *Fault—Current Limiter with Superconducting DC Bias*, 1982, pp. 166-171.
Hawley et al., *Performance of a 1 MV A High Temperature Superconductors-Enabled Saturable Magnetic Core-Type Fault Current Limiter*, 2004, pp. 255-259.

Primary Examiner—Stephen W. Jackson
Assistant Examiner—Scott Bauer
(74) Attorney, Agent, or Firm—Fay Kaplun & Marcin, LLP (57) ABSTRACT

A superconducting current limiting device (30) comprising: an interconnected high magnetic permeability structure including a central core (50) interconnected to at least a first and second arm (31, 32) branching off therefrom; a superconductive coil (33, 34) surrounding the central core for biasing the central core; a first alternating current coil (36, 37) surrounding the first arm and interconnected to an alternating current source; a second alternating current coil (38, 39) surrounding a second arm and interconnected to an alternating current load; the first and second alternating current coils being magnetically coupled to the central core wherein the device operates so as to limit the current passing through the device upon the occurrence of a fault condition in the load.

14 Claims, 7 Drawing Sheets

U.S. PATENT DOCUMENTS 5,155,676 A * 10/1992 Spreen ....................... 363/126
5,930,095 A * 7/1999 Joo et al. ...................... 361/58
6,795,282 B2 * 9/2004 Neumuller et al. ........... 361/19

* cited by examiner

FIG. 7

SUPERCONDUCTING FAULT CURRENT LIMITER

FIELD OF THE INVENTION

The present invention relates to the field of superconductor fault current limiters and, in particular, discloses a High Temperature Superconductor (HTS) Fault Current Limiter (FCL) having a compact design utilising either split or solid limb cores or a combination of both.

BACKGROUND OF THE INVENTION

The discovery of high temperature superconductors has lead to the development of a number of applications for their use. Superconductors are known to have the property that they have zero direct current (DC) resistance below a critical temperature $T_c$. They also have zero DC resistance below a critical current $I_c$ and a critical magnetic field $B_c$.

One potential use of HTS is in FCLs. HTS can be used in FCLs in a number of ways, and the use of HTS to limit fault currents is an elegant solution to the ever-present short circuit threat in power networks.

Figure 1:
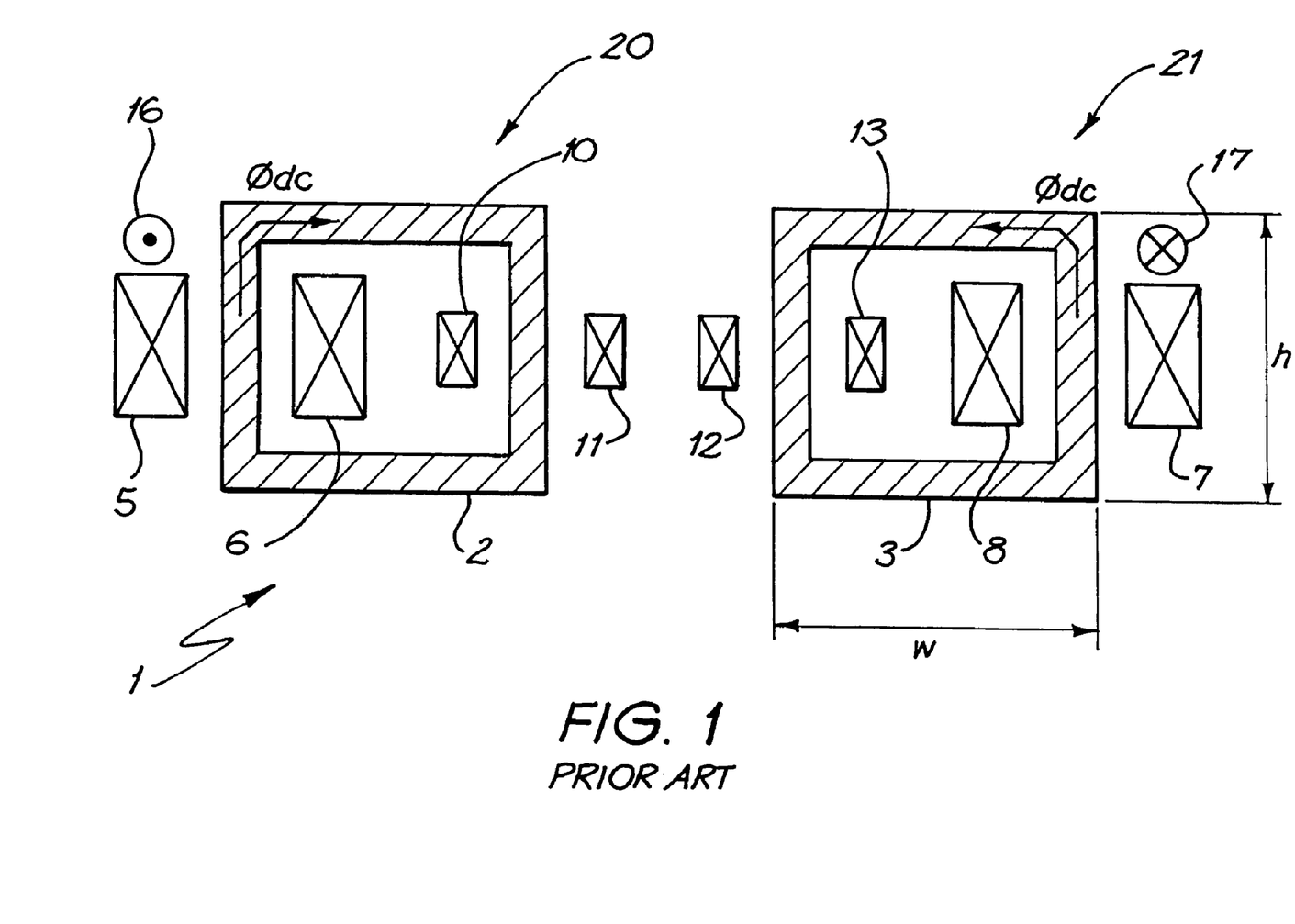
FIG. 1 illustrates schematically a fault current limiter disclosed with reference to the background art.

There are several different methods to incorporate HTS in an FCL design. FIG. 1 illustrates schematically a sectional view through a known form of DC saturated HTS FCL. Arrangement 1 of FIG. 1 utilises two separate closed iron cores 2, 3. Each of the cores has a separate DC HTS coil winding, with a first winding including sectional portions 5, 6 and a second winding including sectional portions 7, 8. Each of the DC HTS coil windings contains N turns.

Similarly, two series of alternating current (AC) linkage windings, including a first winding having sectional portions 10, 11 and a second winding having portions 12, 13 are also provided, with each of the windings having n turns.

Each of the iron cores structures has a given height h and a given width w. During operation, each core is saturated to a predetermined flux density value $\phi_{dc}$ of opposite sense, with the opposite sense being indicated by standard dot notation 16, 17. The DC current flows out of the page 16 in the positive cycle saturated core 5, 6, and into the page 17 in the negative cycle saturated core 7, 8. These points on the DC magnetisation curve of the cores are represented as $\pm B_{dc}$ and $\pm H_{dc}$, respectively.

The required ampere-turns of each HTS DC coil 5, 6 and 7, 8 is given by $$NI=2(2w+2h)H_{dc} \quad (1)$$

where N is the number of DC turns, I is the HTS coil excitation DC current, w is the effective core structure width in the plane of the paper of FIG. 1, h is the effective core structure height in the plane of the paper of FIG. 1, and $H_{dc}$ is the design value for the saturation of the core.

The AC windings 10, 11 and 12, 13 are then arranged such that the differential permeability $\mu_{diff}$ from each AC coil is in the opposite sense to each windings' core magnetisation. The variable, $\mu_{diff}$ is defined by $$\mu_{diff}=(dB/dH)|_{average}=\Delta B/\Delta H \quad (2)$$

where $\Delta B$ and $\Delta H$ are the maximum extents of the minor hysteresis loop at the DC bias points $\pm B_{dc}$ and $\pm H_{dc}$, respectively.

In addition, the relative differential permeability may be defined as $$\mu_{diff}=\mu_{diff}/4\pi*10^{-7}.$$

For reference, the magnetic reluctance of the iron core presented to the DC coil is $$R=(Hl)/(BA)=l/\mu A \quad (3)$$

where R is the magnetic reluctance [$H^{-1}$], B is the magnetic field [T], A is the cross-sectional area of the iron core (not including any insulation or varnished area) [$m^2$], $\mu$ is the magnetic permeability of the iron core [$Hm^{-1}$], l is the magnetic length of each core that is approximately equal to 2 w+2 h [m], and H is the magnetic induction (NI/l) [$Am^{-1}$].

The steady state AC impedance presented to the network line in which the core is in series may be expressed in phasor notation as $$Z=R+2\pi f(n^2A/l)\mu_{diff}i \quad (4)$$

where R is the resistance of the AC coils, f is the frequency of operation (i.e. 50 Hz), i is the square root of −1 (the imaginary number), and n is the number of turns of the AC winding. R is normally negligible compared to the imaginary part of the impedance. For an effective HTS FCL, the normal operating inductance of the core must be small so as not to impose any unnecessary regulation of the line or impedance to the current flow. This is normally achieved by ensuring that $B_{dc}$ is greater than 1.5 T, and thereby ensuring that $\mu_{diff}$ is approximately 1, the device thereby behaving effectively as an air core inductor.

In operation, the DC field is chosen such that an oscillatory fault current of peak value $I_f$, determined by the network impedance and surge characteristics, increases the differential permeability to that of the maximum DC value. The size of the cores, DC current, and DC turns can be calculated based on the fault level and the permeability of the iron so that $$nI_{f(max)}/l=H_{dc} \quad (5)$$

and $$nI_{f(min)}/l=H_{dc}-H_{dc(sat)} \quad (6)$$

where n is the number of AC turns, l is the length of the magnetic circuit, $H_{dc}$ is the DC field intensity at which the iron core has a maximum $\mu_{diff}$, $H_{dc(sat)}$ is the field intensity required to saturate the core, $I_{f(max)}$ is the maximum fault current that the HTS FCL is required to limit and $I_{f(min)}$ is the minimum fault current that the HTS FCL is required to limit.

Owing to the oscillatory nature of a fault current, two separate cores 20, 21, as shown in FIG. 1, are normally required to provide different senses of the AC coil current to the AC windings, as fault currents are oscillatory in nature, and require limiting on both the positive and negative parts of each cycle. Using this concept, a three-phase HTS FCL would require six saturated cores, which would entail six separate HTS DC windings with associated cryogenics. Such a large number of HTS DC windings adds significantly to the expense of the overall device.

SUMMARY OF THE INVENTION

It is an object of the present invention to provide for an improved form of superconducting FCL design.

In accordance with a further aspect of the present invention, there is provided a superconducting current limiting device comprising an interconnected high magnetic permeability structure including a central core interconnected to at least a first and second arm branching off there from; a superconductive coil surrounding the central core for biasing the central core; a first alternating current coil surrounding the first arm and interconnected to an alternating current source; and a second alternating current coil surrounding a second arm and interconnected to an alternating current load; the first and second alternating current coils being magnetically coupled to the central core wherein the device operates so as to limit the current passing through the device upon the occurrence of a fault condition in the load.

Preferably, the first and second arms substantially form a loop interconnecting a first and second end of the central core. In one embodiment, each of the loops can include an air gap separating one portion of the loop from a second portion. The high magnetic permeability structure can be formed from a ferrous material. Preferably, the cross-sectional width of the high magnetic permeability material forming the core is substantially twice the cross-sectional width of the high magnetic permeability material forming the arms.

In accordance with a first aspect of the present invention, there is provided a superconducting current limiter device comprising a central core formed from a high magnetic permeability material; a superconducting coil surrounding the central core for biasing the central core; an alternating current coil interconnected to an alternating current source; and being magnetically coupled to the central core wherein the device operates so as to limit the current passing through the device upon the occurrence of a fault condition in the load.

In accordance with a further aspect of the present invention, there is provided a multiphase superconducting current limiter device including: a central core formed from a high magnetic permeability material; a superconductive coil surrounding the central core for biasing the central core; a first series of alternating current phase coils each interconnected to a phase of an alternating current source; a second series of alternating current coils interconnected to a phase of at least one alternating current load; the first and second series of alternating current coils being magnetically coupled to the central core wherein the device operates so as to limit the current passing through the device upon the occurrence of a fault condition in the load.

In accordance with a further aspect of the present invention, there is provided a multi-stage superconducting fault current limiter device comprising: at least a first and second superconducting fault current limiters, the first superconducting fault current limiter designed to current limit a first portion of a transient fault and the second superconducting fault current limiter being designed to current limit a second portion of a transient fault

BRIEF DESCRIPTION OF THE DRAWINGS

Preferred embodiments of the present invention will now be described, by way of example only, with reference to the accompanying drawings in which.

DESCRIPTION OF THE PREFERRED AND OTHER EMBODIMENTS

In the preferred embodiment, there are disclosed methods for the construction of a compact HTS FCL. Both single phase and three phase arrangements are disclosed.

Figure 2:
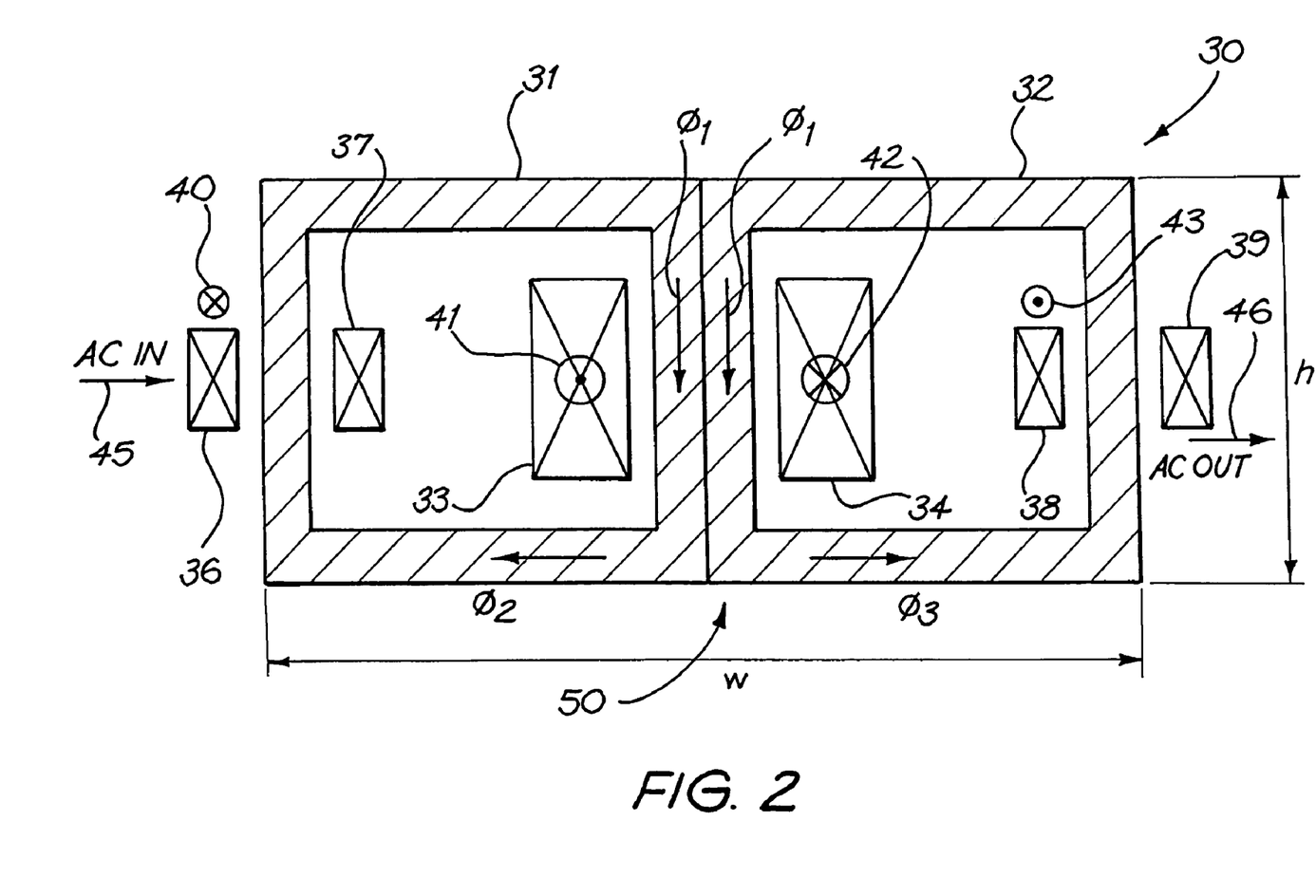
FIG. 2 illustrates schematically a sectional view through a fault current limiter arrangement in accordance with the preferred embodiment.

Turning initially to FIG. 2, there is illustrated schematically a sectional view of an initial design arrangement 30 for a split core single phase HTS FCL. The unit 30 includes a split core having components 31, 32 so as to allow for a substantial reduction in foot print size. In the arrangement 30, the DC saturated core windings are internally located 33. The AC linkage windings are also provided in pairs 36 and 38. The current carrying directions are as indicated via standard dot notation 40, 41, 42, and 43. The AC in port is assumed to occur at port 45 and the AC out port at port 46.

The design of the arrangement 30 and, in particular, the dimensions of the core 50 are in accordance with certain rules. The design is a compromise between the DC current and the level of saturation required. In an example case, the central limb 50 is designed to have twice the cross sectional area of the outer limbs. Depending on the fault level to be limited, the optimal area of the central limb would be a value situated between one and two times that of the outer limb area. Generally the following formulas can be used:

$$2\Phi_1 = \Phi_2 + \Phi_3 \quad (7)$$

and $$B_1 A_1 = B_2 A_2 + B_3 A_3 \quad (8)$$

where B is the magnetic flux density in each limb [T], A is the cross sectional area of each limb [m²], and $\Phi$ is the magnetic flux in each limb [Wb]. In one example design, $B_2 = B_3$ and $A_2 = A_3$.

The AC coils 36, 39 are connected to the AC line such that, the flux density of each coil is of opposite sense relative to the main DC flux, as indicated by the dot notation 40, 43 of FIG. 2. The central limb is a split limb to allow independent net fluxes $\Phi_2$, $\Phi_3$ to be set up in each external limb. This may be of a different net cross sectional area to the external limbs, depending on the designed intensity of $B_2$ and $B_3$.

It should be noted that this arrangement has a number of advantages including:

1. Only one DC winding is required 33, 34, thus saving on DC coil costs.
2. Only one containment vessel for the DC coil is required, thus saving on the unit's cost.
3. The footprint size is reduced, which confers advantages in placement.
4. A reduced volume of superconductor is required for the DC coil bias.
5. Only one cooling device for the DC coil is required.

The relationship for the new number of turns required in the DC coil is:

$$N'T'_{dc} = (3h' + 2w')H_{dc} \quad (9)$$

where N' is the number of turns in the DC coil, $I'_{dc}$ is the current in the DC coil, W' is overall width of the three limb core, and h' is the height of the three limb core.

Split limbs are commonly manufactured and available from transformer manufacturers. For example, in the case where a large core size necessitates an oil-cooling duct to ensure efficient cooling of the core, or, for five limb cores, where the central limb is divided into two to save on corner losses in the cores.

Figure 3:
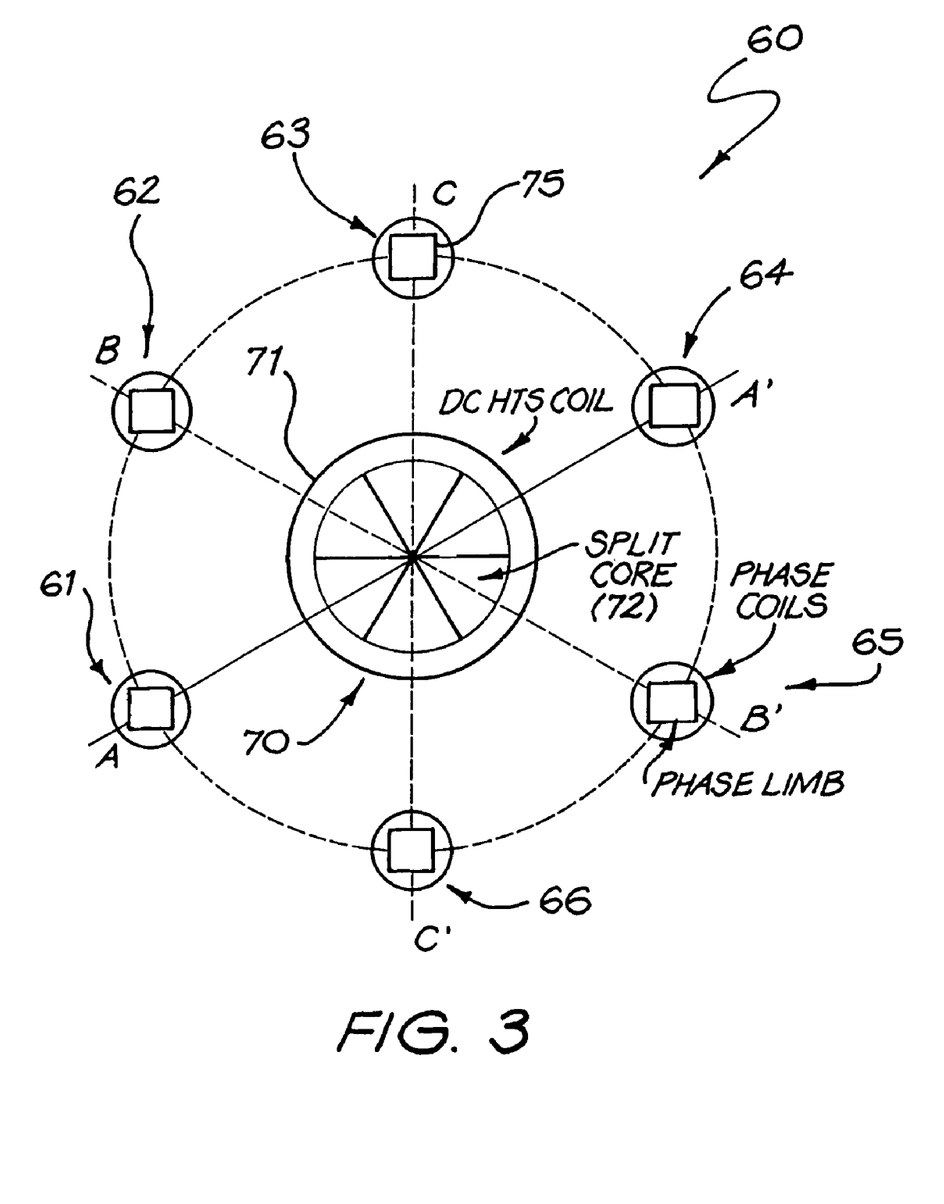
FIG. 3 illustrates the extension of the arrangement of FIG. 2 to multiple phases.

One form of extension of the arrangement of FIG. 2 to the three-phase case is shown schematically in FIG. 3. FIG. 3 illustrates a top view of the three-phase core arrangement and coils. Each input phase A, B, C, 61–63 has a corresponding output phase A', B', C' 64–66. The phases are arranged around a central core 70, which includes a DC HTS coil 71 and a split core 72. The iron core cross sections e.g. 75 are shown schematically in FIG. 3 as squares for convenience, but, can be of a cruciform shape to approximate a circular cross section. FIG. 3 represents one particular arrangement and is by no means the only arrangement. If required, the six sub coils 61–66 may be placed closer together to form a narrower regime, provided sufficient clearance between the phases is present.

Equations 7 and 8 will still apply in the three-phase case in each phase section by the principle of superposition. The advantages of the three-phase FCL design as shown in FIG. 3 include:
1. Only one cryogenic system and envelope is required for the DC HTS core 71. This saves on cooling losses as a larger cooling system can be employed. (Cooling efficiency normally increases with cryogenic cooling plant size).
2. The arrangement of FIG. 3 has a reduced footprint.
3. The arrangement 60 requires a lower volume of superconductor in the DC bias coil.

Figure 4:
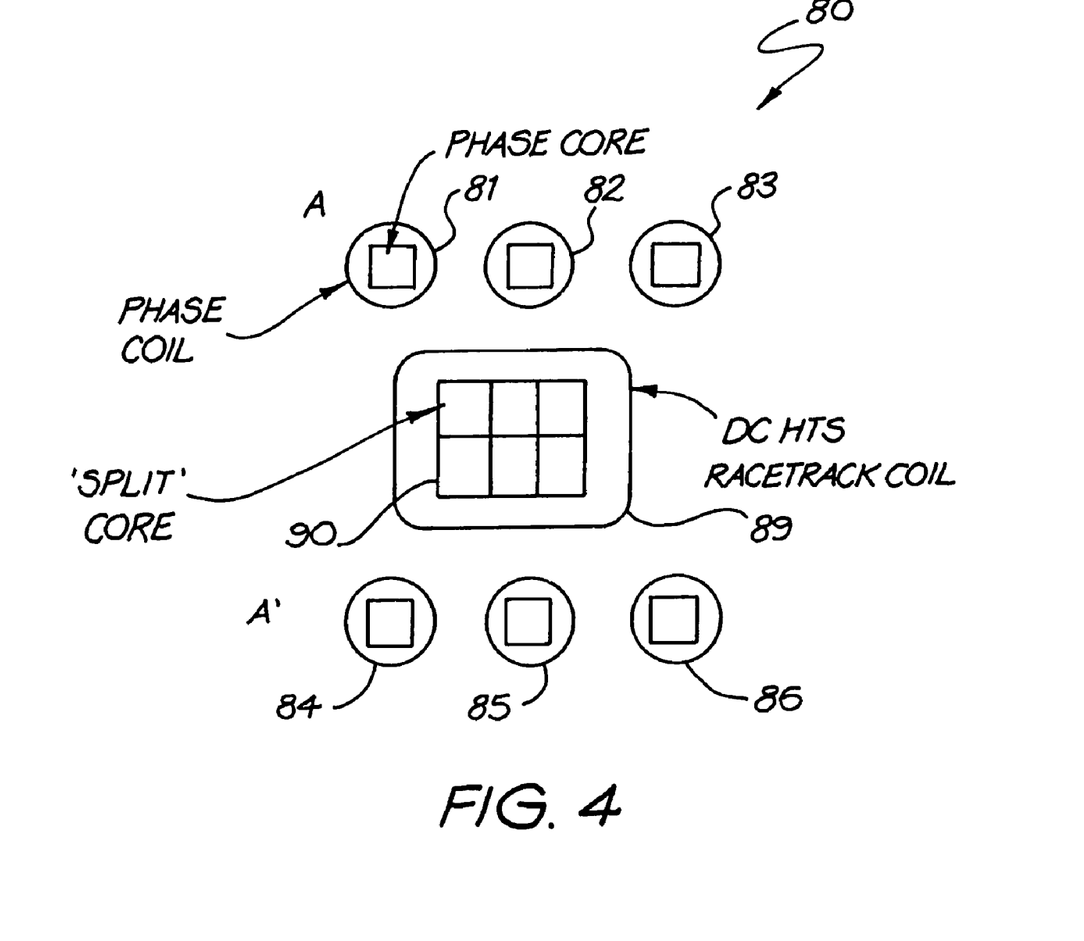
FIG. 4 illustrates an alternative arrangement for a three phase Fault Current Limiter device.

Other arrangements of the split core and phase coils arranged in a rectangle are possible, depending on the footprint available. For example, FIG. 4 shows schematically a racetrack HTS coil used to reduce one of the linear dimensions, allowing a simple core structure to be used. In the arrangement shown in FIG. 4, there are two coils connected such that the individual flux produced by each is opposite to that produced by the other. These coils are arranged around a central core including a DC HTS racetrack coil 89 and split core arrangement 90.

Figure 5:
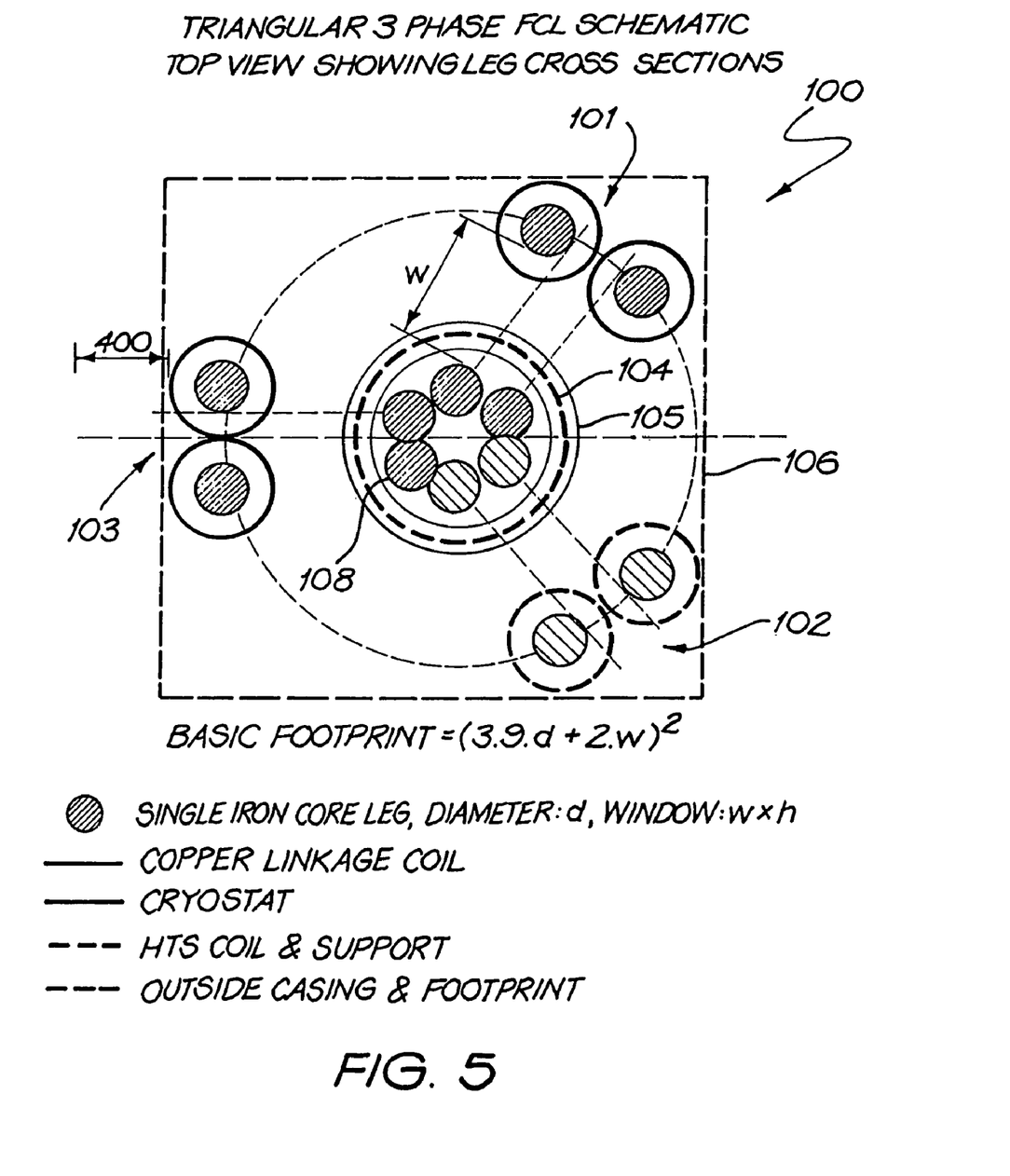
FIG. 5 illustrates a high voltage Fault Current Limiter device.

In a high voltage (HV) FCL design, an appropriate arrangement of the cores can be as shown FIG. 5. This design maximises the insulation clearance between the individual phases. In this arrangement 100, three phases 101, 102 and 103 are provided. They are arranged around a DC HTS coil 104, which is immersed in a cryostat 105. Also immersed in the cryostat are the Iron core leg elements e.g. 108.

A number of other modifications can be made to the arrangements disclosed. For example, the core 31, 32 of FIG. 1 need not be a split core. In three phase arrangements, the split central core decouples the AC flux from the three phases and the two opposing orientations from each other, allowing the single DC coil to saturate all six cores. A fault on one phase will bring only that portion of the core out of saturation without affecting the impedance of any other core path. However, in the alternative, the central core need not be split at all, and may be manufactured as a solid core without any deterioration in the fault current limiting properties. For example, in phase-to-phase faults, or in phase-to-ground faults.

Preferably, the iron core will be constructed from thin laminations of cold rolled silicon steel transformer plate that are electrically insulated from each other by a thin insulation coating, and arranged in the same manner as in a normal transformer core. Amorphous cores, ferrite cores, and any other low-loss material capable of being magnetically saturated at flux densities in excess of 1.5 T are suitable, provided they exhibit a characteristic high incremental permeability region and a low incremental permeability region.

Figure 7:
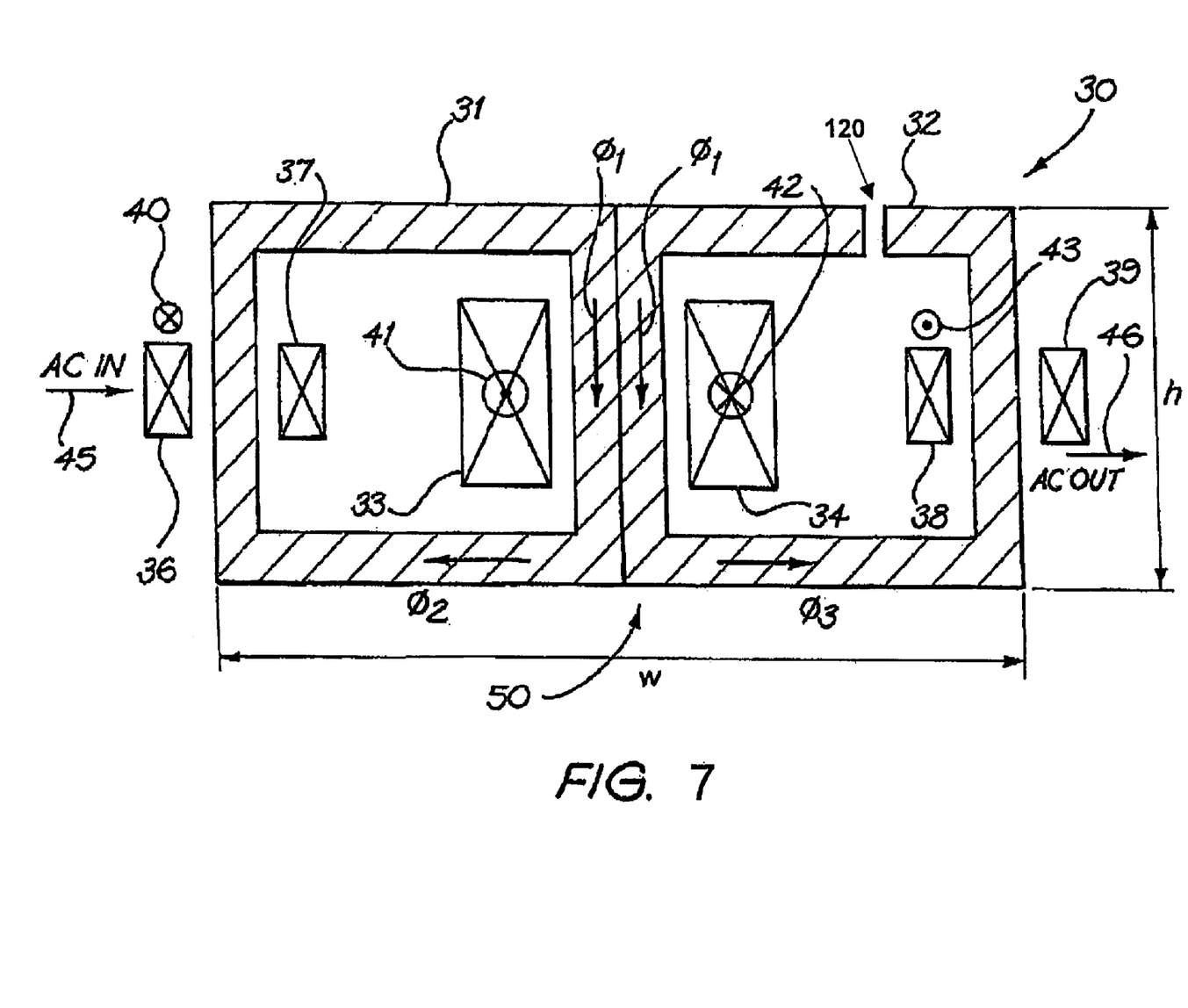
FIG. 7 illustrates an alternative design where one of the arms has an air gap.

Further, as shown in FIG. 7, the iron core may contain an air gap 120 to allow for a reduction of the size of the FCL. The magnetic length of the iron core determines the amount of superconductor required to bias the core. The inclusion of the air gap 120 in the iron core gives the designer another degree of freedom, which can reduce the volume of superconductor required. The air gap 120 helps to minimize the linear dimensions of the iron required to bias the core in the DC state, and therefore, provides a smaller and lighter device.

Figure 6:
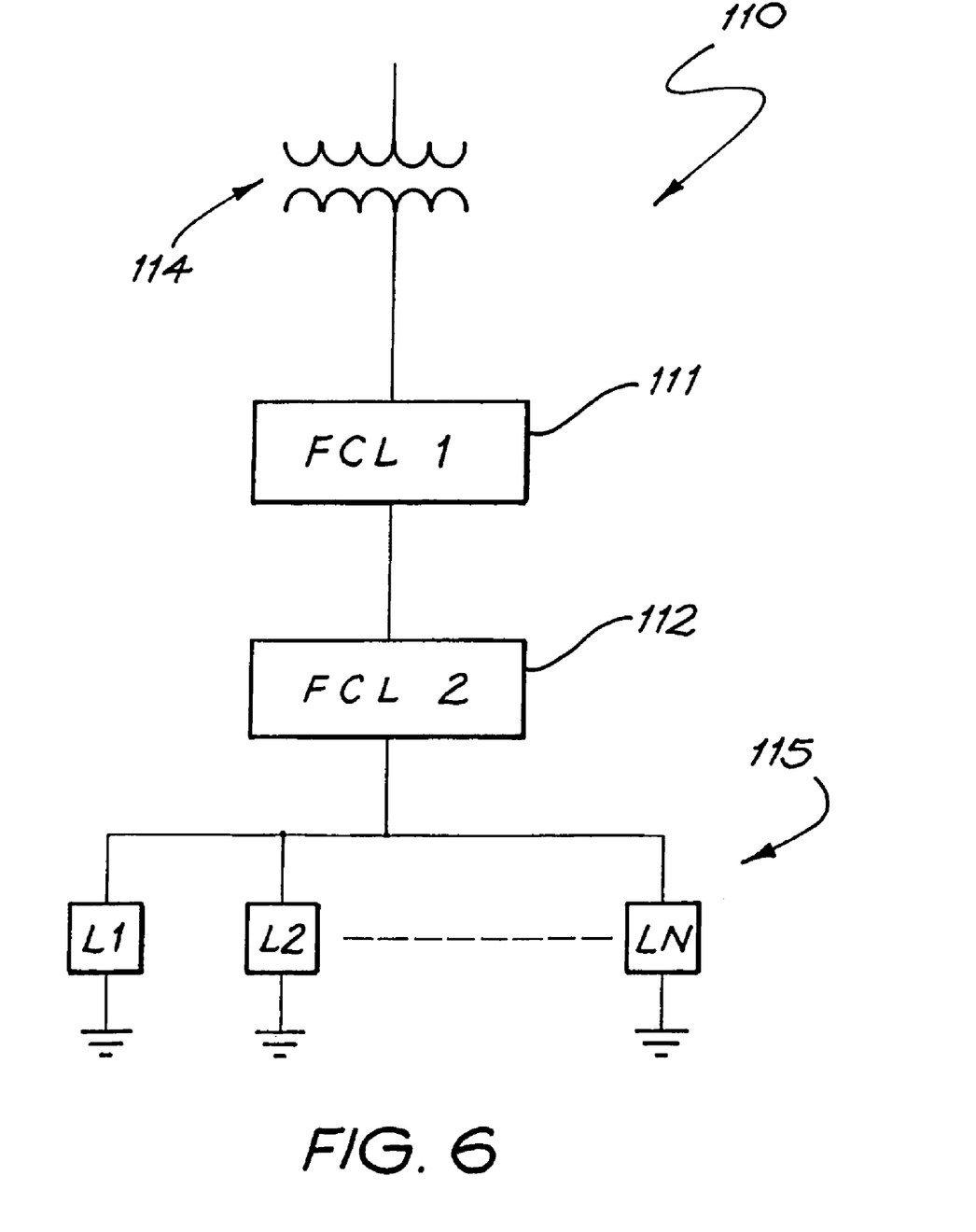
FIG. 6 illustrates the process of utilising multiple fault current limiters to form an overall Fault Current Limiter device.

Further, in alternative designs, multiple FCL devices can be used to deal with transient faults. Typically, a fault current consists of an initial transient with an initial peak in the first half wave cycle many times that of the rated current. This transient decays away over a relatively short time period, however, circuit breakers must be rated to cope with the initial peak. The fault current also contains a decaying DC offset, and a steady state response. Each of the three components will have a magnitude dependent on the network characteristics or item being protected. The transient response and DC offset decay away in a time period determined by the impedance and resistance of the network. Turning now to FIG. 6, there is illustrated, again schematically, one form of multiple FCL arrangement 110. In this arrangement, two FCL devices 111, 112 are located between a generator 114 and a series of loads 115. The two fault current limiters in series may be used to deal with the transient and DC part of a fault current and the steady state part of the fault current independently. If the network characteristics are such that the decaying DC component of the fault current is significant and of a similar magnitude to the transient peak, then a third FCL may be used, specifically designed to limit this part of the fault current The different parts of the fault current waveform can be FCL limited to allow circuit breakers of a lower rating to be selected or to allow a sub-station to run with multiple transformers connected in parallel and providing current to the load via a single "solid" bus bar. Each of the FCL devices 111, 112 can be customised to deal with different portions of the input waveform. For example, the FCL 1 can deal with the initial peak transient and DC part and the FCL 2 can deal with the steady state component of the fault current. By using separate FCL units for different parts of the transient, a single larger FCL need not be employed. Although it would be possible to manufacture a single FCL to deal with all parts of the waveform, this type of FCL will be unnecessarily large, and will have an unacceptably high superconductor content, and so be more expensive than two smaller independent FCLs.

Single or three phase overall fault current limiters can then be constructed consisting of two DC biased FCLs 111, 112 employing any of the above methods, connected electrically in series, and each biased differently on the B-H curve to deal with the different parts of the fault waveform. This allows for the limitation of both the transient and steady state parts of the fault current waveform. Generally, the FCL required to deal with the transient part of the waveform will require a larger core area with less copper linkage and superconductor ampere turns. The steady state part of the waveform will require an FCL with a significantly reduced iron cross sectional area, but a larger number of linkage turns. A single biased FCL that could deal with the entire waveform would be larger than two smaller ones designed to deal with each part of the waveform. This is because the superconductor turns must encircle the iron core, so a larger core requires more superconductor material. By trying to limit both parts of the waveform with one device, the length of superconductor increases unnecessarily.

In using liquid nitrogen to cool the HTS coils, the possible operating temperature range of the superconducting coils can be 63–77 K, although there is no restriction on the operational temperature of the superconducting coils, as long as it is below the critical temperature of the superconductor. The method used to cool the coils can be varied in accordance with available requirements. Different alternative can include immersion in a liquid cryogen, e.g. nitrogen, immersion in a gaseous atmosphere, e.g. helium gas at 5–77 K or neon at 30–77 K, or by conduction cooling using a cryocooler.

Further, it would be evident to those skilled in the art of manufacture of superconductor fault current limiters that the device could operate in the case where the HTS is dispensed with. Although such a device is likely to be large, the principle of operation would be the same. Hence, the DC coil could be formed from a Low Temperature superconductor or even a copper coil.

The foregoing description describes the preferred embodiments of the invention. Modifications, obvious to those skilled in the art, can be made thereto without departing from the scope of the Invention.

We claim:

1. A superconducting current limiting device for current limiting a circuit, comprising:
    an interconnected high magnetic permeability structure including a central core coupled to at least a first arm and a second arm branching off there from;
    a high temperature superconductor superconductive coil surrounding the central core for biasing the central core into magnetic saturation during normal operation;
    a first alternating current coil surrounding the first arm and coupled to an alternating current source; and
    a second alternating current coil surrounding the second arm and coupled to an alternating current load,
    wherein the first and second alternating current coils are magnetically coupled to the central core, the device limiting the current passing through the device upon an occurrence of a fault condition in the load by taking the central core out of the magnetic saturation during the fault condition, thereby providing an impedance between the current source and the current load.

2. The device according to claim 1, wherein each of the first and second arms substantially form a loop which couples a first end and a second end of the central core.

3. The device according to claim 2, wherein each of the loops includes a first portion and a second portion, the first and second portions being separated by an air gap.

4. The device according to claim 2, wherein the central core area is substantially between one and two times an outer limb area.

5. The device according to claim 2, wherein the central core area is determined substantially in accordance with the following relationships:

$$2\Phi_1 = \Phi_2 + \Phi_3$$

and $$B_1 A_1 = B_2 A_2 + B_3 A_3$$

wherein B is a magnetic flux density in each limb in tesla, A is a cross sectional area of each limb in meters squared, and $\Phi$ is a magnetic flux in each limb in Webber, and wherein a subscript 1 represents the core and subscripts 2 and 3 represent the arms.

6. The device according to claim 1, wherein the structure is composed of a ferrous material.

7. The device according to claim 1, wherein a first cross-sectional width of a first high magnetic permeability material forming the core is substantially twice a second cross-sectional width of a second high magnetic permeability material forming the arms.

8. The device according to claim 1, wherein the superconductive coil is adjacent to the central core.

9. A multiphase superconducting current limiter device for current limiting a circuit, comprising:
    a central core composed of a high magnetic permeability material;
    a high temperature superconductor superconductive coil surrounding the central core for biasing the central core into magnetic saturation during normal operation;
    a first plurality of alternating current phase coils, each of the first plurality of coils being coupled to a phase of an alternating current source; and
    a second plurality of alternating current coils coupled to a phase of at least one alternating current load,
    wherein the first and second plurality of coils are magnetically coupled to the central core, the device limiting a current passing through the device upon an occurrence of a fault condition in one of the source and the load by taking the central core out of the magnetic saturation during the fault condition, thereby providing an impedance between the current source and the current load.

10. A multistage superconducting fault current limiter device, comprising:
    a first superconducting fault current limiter limiting a current during a first portion of a transient fault; and
    a second superconducting fault current limiter limiting the current during a second portion of the transient fault,
    wherein each of the first and second superconducting fault current limiters includes:
        an interconnected high magnetic permeability structure including a central core coupled to at least a first arm and a second arm branching off there from;
        a high temperature superconductor superconductive coil surrounding the central core for biasing the central core into magnetic saturation during normal operation;
        a first alternating current coil surrounding the first arm and coupled to an alternating current source; and
        a second alternating current coil surrounding the second arm and coupled to an alternating current load,
        wherein the first and second alternating current coils are magnetically coupled to the central core, the device limiting the current passing through the device upon an occurrence of a fault condition in the load by taking the central core out of the magnetic saturation during the fault condition, thereby providing an impedance between the current source and the current load.

11. The device according to claim 10, wherein the first portion includes an initial portion of the transient fault and the second portion includes a steady state portion of the transient fault.

12. A multiphase superconducting current limiter device, comprising:

a single cryostat;

a single cryocooler; and an interconnected high magnetic permeability structure including a central core coupled to at least a first arm and a second arm branching off there from;

a single superconducting coil surrounding the central core for biasing the central core into magnetic saturation during normal operation;

a first alternating current coil surrounding the first arm and coupled to an alternating current source; and a second alternating current coil surrounding the second arm and coupled to an alternating current load, wherein the first and second alternating current coils are magnetically coupled to the central core, the device limiting the current passing through the device upon an occurrence of a fault condition in the load by taking the central core out of the magnetic saturation during the fault condition, thereby providing an impedance between the current source and the current load.

13. A DC saturated superconducting current limiter device, comprising:

an interconnected high magnetic permeability structure including an iron core including at least one air gap, the central core coupled to at least a first arm and a second arm branching off there from;

a high temperature superconductor superconductive coil surrounding the central core for biasing the central core into magnetic saturation during normal operation;

a first alternating current coil surrounding the first arm and coupled to an alternating current source; and a second alternating current coil surrounding the second arm and coupled to an alternating current load, wherein the first and second alternating current coils are magnetically coupled to the central core, the device limiting the current passing through the device upon an occurrence of a fault condition in the load by taking the central core out of the magnetic saturation during the fault condition, thereby providing an impedance between the current source and the current load.

14. A series of multi-phase DC saturated superconducting current limiter devices, comprising:

a plurality of iron cores, wherein at least one of the plurality of iron cores includes at least one air gap, wherein at least one of plurality of iron cores includes a continuous iron core, and wherein each of the devices further includes:

a high temperature superconductor superconductive coil surrounding the respective iron core for biasing the iron core into magnetic saturation during normal operation;

a first alternating current coil surrounding a first arm coupled to the respective iron core and coupled to an alternating current source; and a second alternating current coil surrounding a second arm coupled to the respective iron core and coupled to an alternating current load, wherein the first and second alternating current coils are magnetically coupled to the respective iron core, the device limiting the current passing through the device upon an occurrence of a fault condition in the load by taking the respective iron core out of the magnetic saturation during the fault condition, thereby providing an impedance between the current source and the current load.

* * * * *